(12) United States Patent
Steinlage et al.

(10) Patent No.: US 9,775,274 B2
(45) Date of Patent: Oct. 3, 2017

(54) ADJUSTABLE DISK MOUNTING ASSEMBLY

(71) Applicant: DEERE & COMPANY, Moline, IL (US)

(72) Inventors: David L. Steinlage, Centralia, KS (US); Robert T. Casper, Mingo, IA (US); Mark D. Beeck, Ankeny, IA (US); Daniel P. Bruns, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 318 days.

(21) Appl. No.: 14/226,685

(22) Filed: Mar. 26, 2014

(65) Prior Publication Data

US 2015/0271980 A1 Oct. 1, 2015

(51) Int. Cl.
*A01B 63/24* (2006.01)
*A01B 15/16* (2006.01)
*A01B 23/06* (2006.01)

(52) U.S. Cl.
CPC .............. *A01B 15/16* (2013.01); *A01B 23/06* (2013.01); *A01B 63/245* (2013.01)

(58) Field of Classification Search
CPC .............................. A01B 63/245; A01B 39/22
USPC .................................................. 172/572, 576
See application file for complete search history.

(56) References Cited

U.S. PATENT DOCUMENTS

| | | | | |
|---|---|---|---|---|
| 2,430,434 A | * | 11/1947 | Rutter .................. | A01B 21/086 172/574 |
| 2,651,905 A | * | 9/1953 | Schlueter ................ | A01B 7/00 171/58 |
| 2,781,710 A | * | 2/1957 | Padrick ................ | A01B 21/086 172/185 |
| 3,554,297 A | * | 1/1971 | Lehman ............... | A01B 63/245 172/573 |
| 4,126,190 A | * | 11/1978 | Wylie .................... | A01B 39/14 172/624.5 |

(Continued)

OTHER PUBLICATIONS

John Deere 2510C Nutrient Applicator, https://www.deere.com/wps/dcom/en_US/products/equipment/nutrient_application/nutrient_applicators/2510c/2510c.page#viewTabs, 2 pages.

(Continued)

*Primary Examiner* — Thomas B Will
*Assistant Examiner* — Joel F. Mitchell
(74) *Attorney, Agent, or Firm* — Taft Stettinius & Hollister LLP; Stephen F. Rost

(57) ABSTRACT

An agricultural implement has a ground opening and closing assembly that readily allows for adjustment of a pair of closing disks into different, discreet or infinitely variable, home positions that vary in height, disk spacing and fore/aft dimension. In one form, a pair of disk mounts have a pair of mounting receptacles for each support arm. Each support arm is configured to be inserted into one of the receptacles to set the height and fore/aft position of the associated closing disk. Mounting openings can be formed in the disk mounts and the support arms, and a simple pin mechanism received in aligned mounting openings can effect manual disk adjustment without tools. The disk mounts and the support arms can have multiple mounting openings spaced apart differently from the ground opening member to vary the spacing between the closing disks.

19 Claims, 11 Drawing Sheets

(56) References Cited

U.S. PATENT DOCUMENTS

| | | | | |
|---|---|---|---|---|
| 4,509,603 | A * | 4/1985 | Adams | A01B 39/22 |
| | | | | 172/427 |
| 5,595,249 | A * | 1/1997 | Steinberger | A01B 35/18 |
| | | | | 172/156 |
| 6,102,132 | A * | 8/2000 | Schimke | A01B 15/18 |
| | | | | 111/139 |
| 6,761,120 | B2 | 7/2004 | Kovach et al. | |
| 8,006,775 | B2 | 8/2011 | Steinlage | |

OTHER PUBLICATIONS

John: Deere ExactEmerge(TM) and MaxEmerge(TM) 5 Row Units Brochure, Feb. 2014, 12 pages.
John Deere 2700 Mulch Ripper Primary Tillage, http://www.deere.com/wps/dcom/en_US/products/equipment/tillage_equipment/primary_tillage/2700_mulch_ripper/2700_mulch_ripper.page, 4 pages.
John Deere Primary Tillage Brochure, Dec. 2012, 36 pages.
John Deere Secondary Tillage Brochure, Dec. 2012, 28 pages.
John Deere Planter Closing Wheel Down Pressure Adjustment, Planter Depth Adjustment, and Planter Heavy-Duty Adjustable Downforce Springs, 3 pages.

* cited by examiner

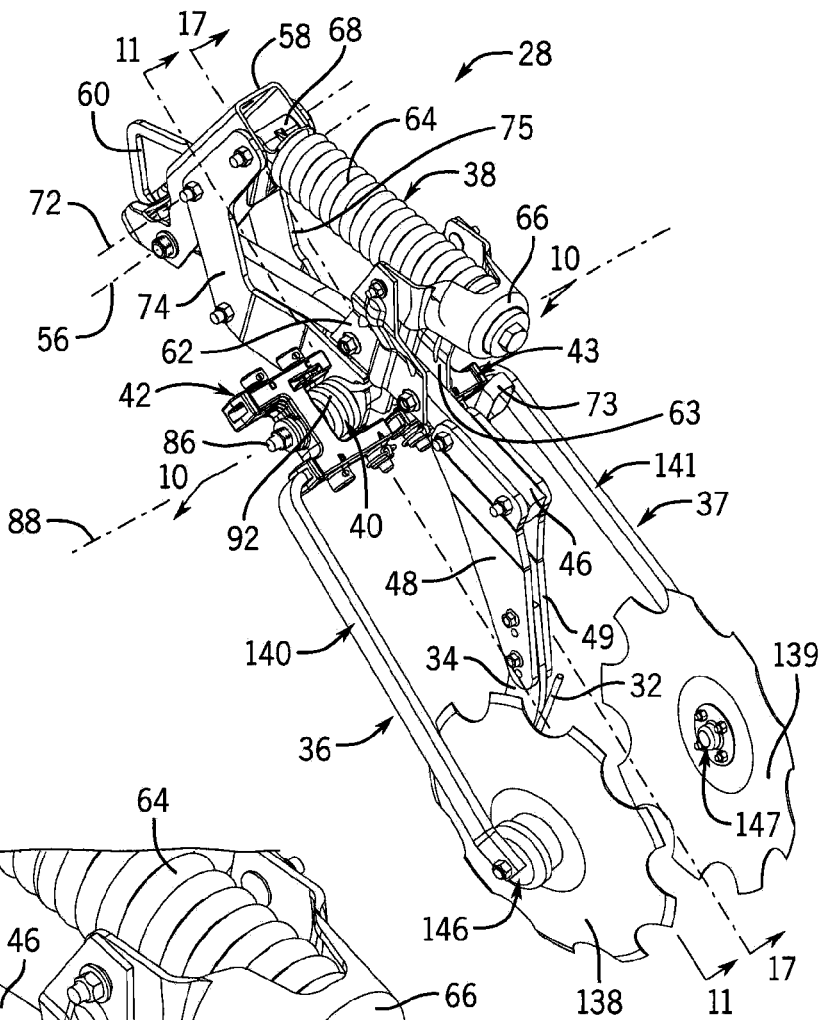

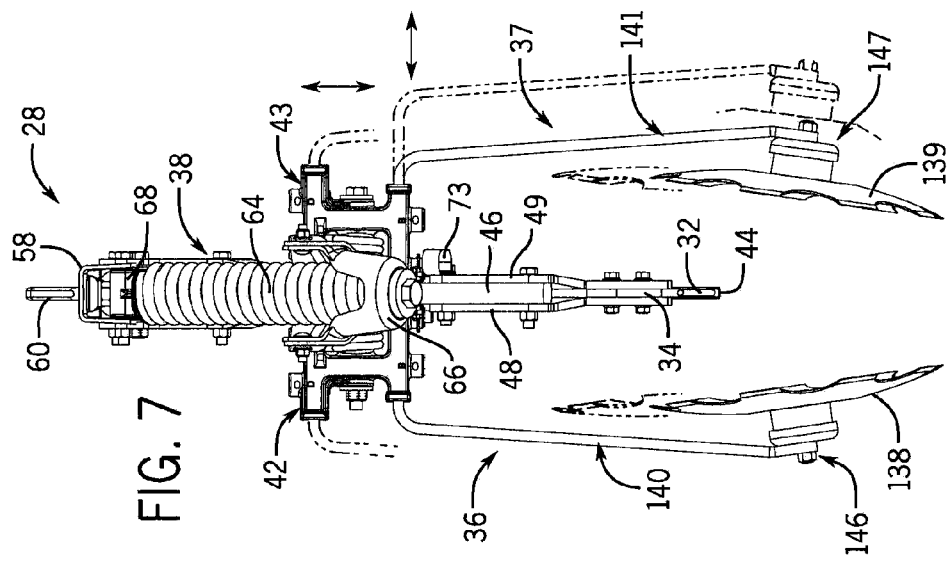
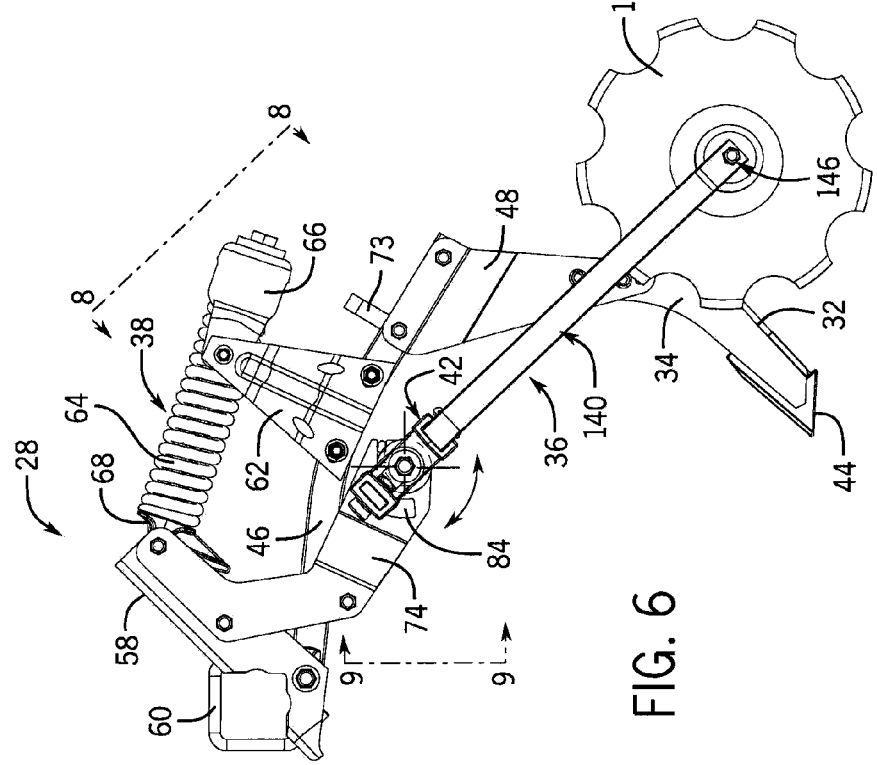

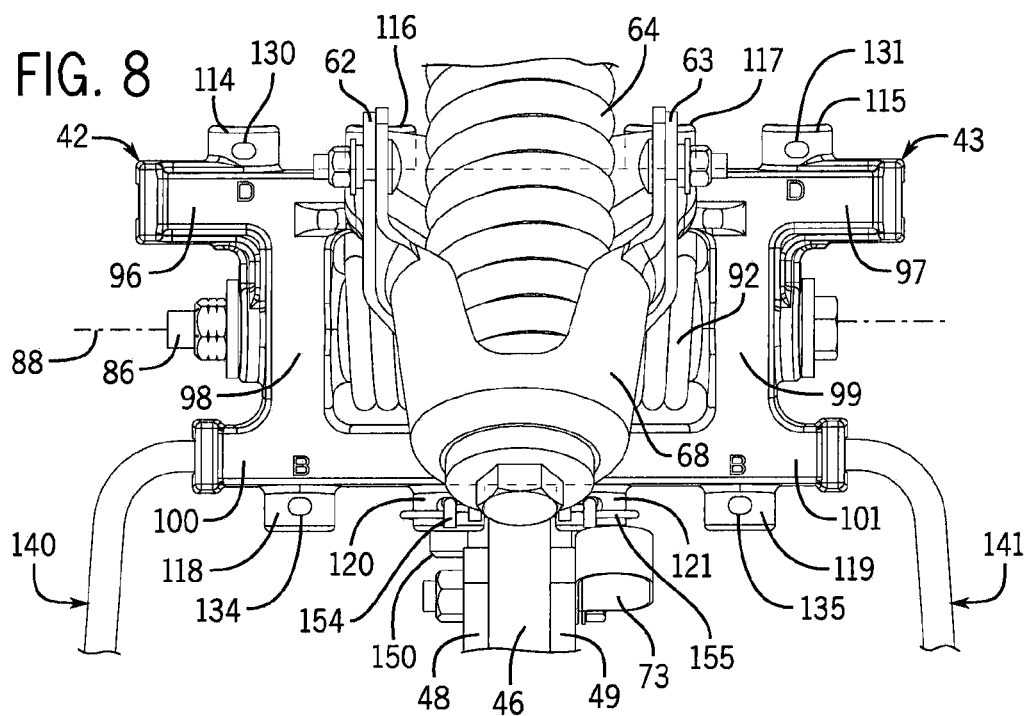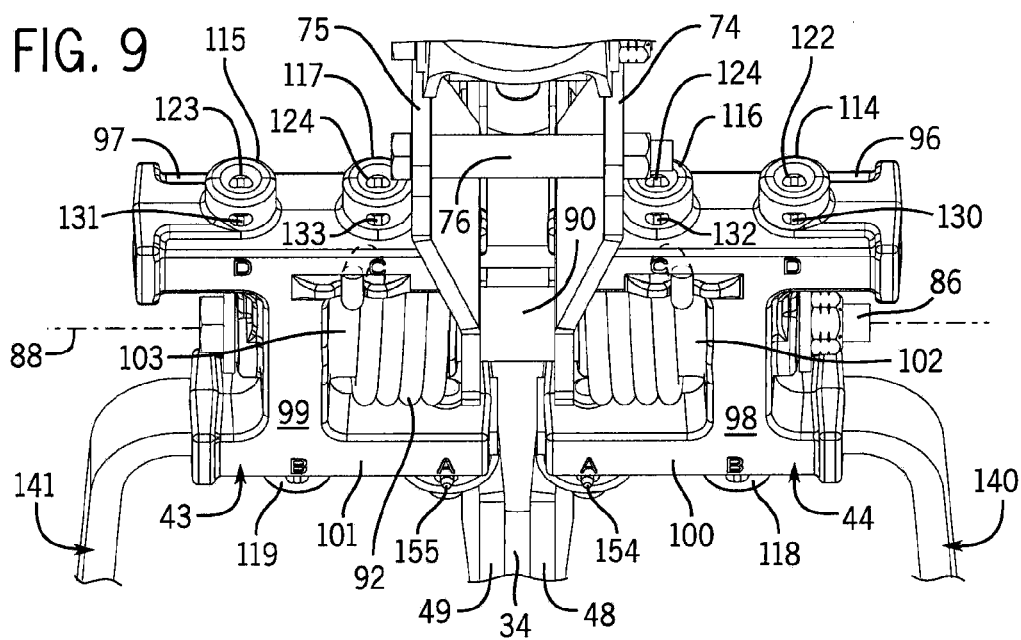

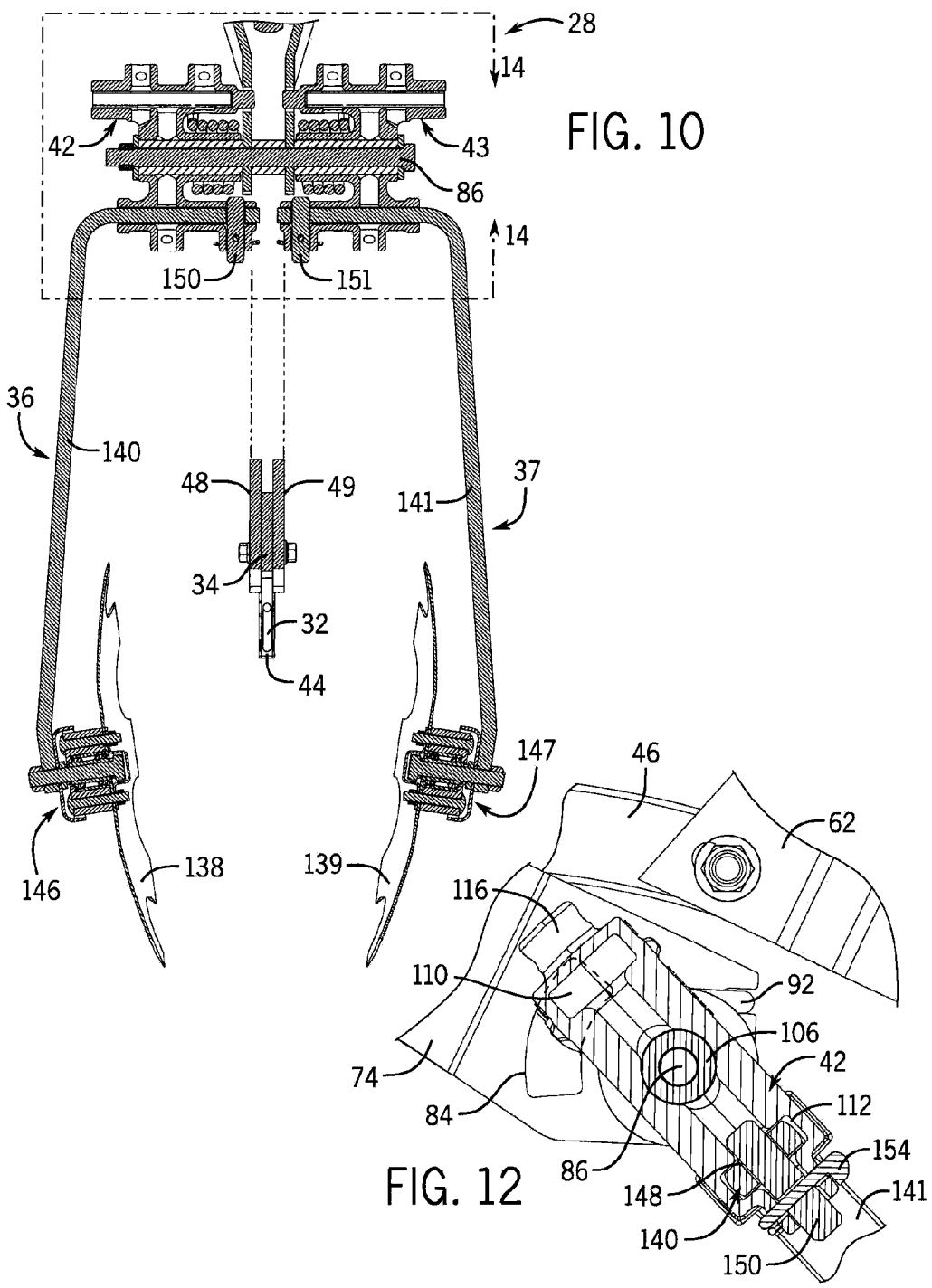

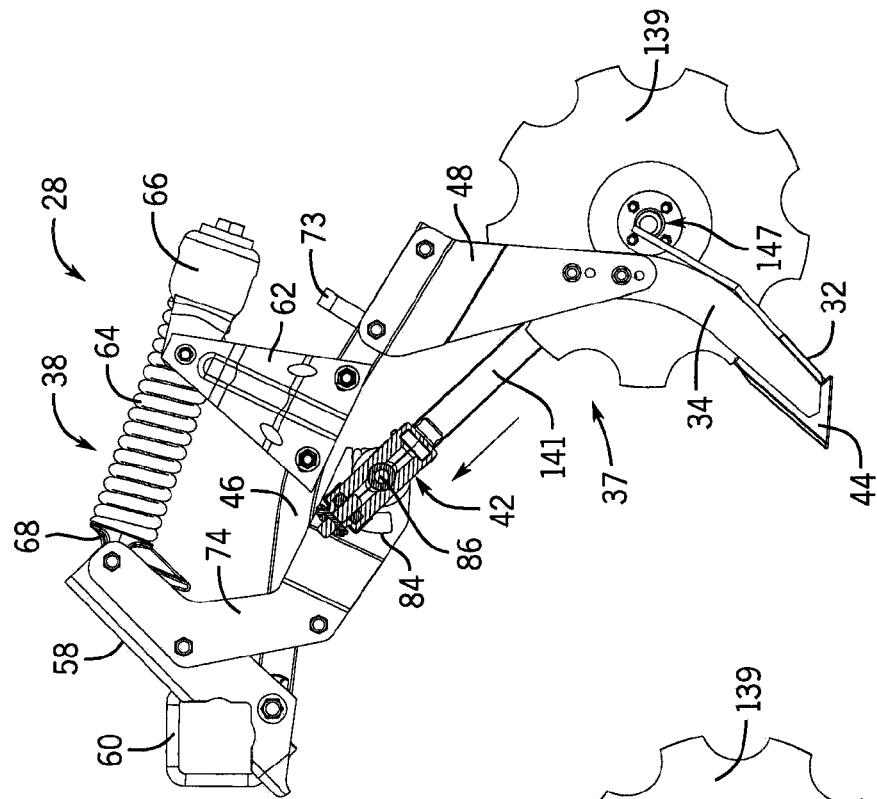
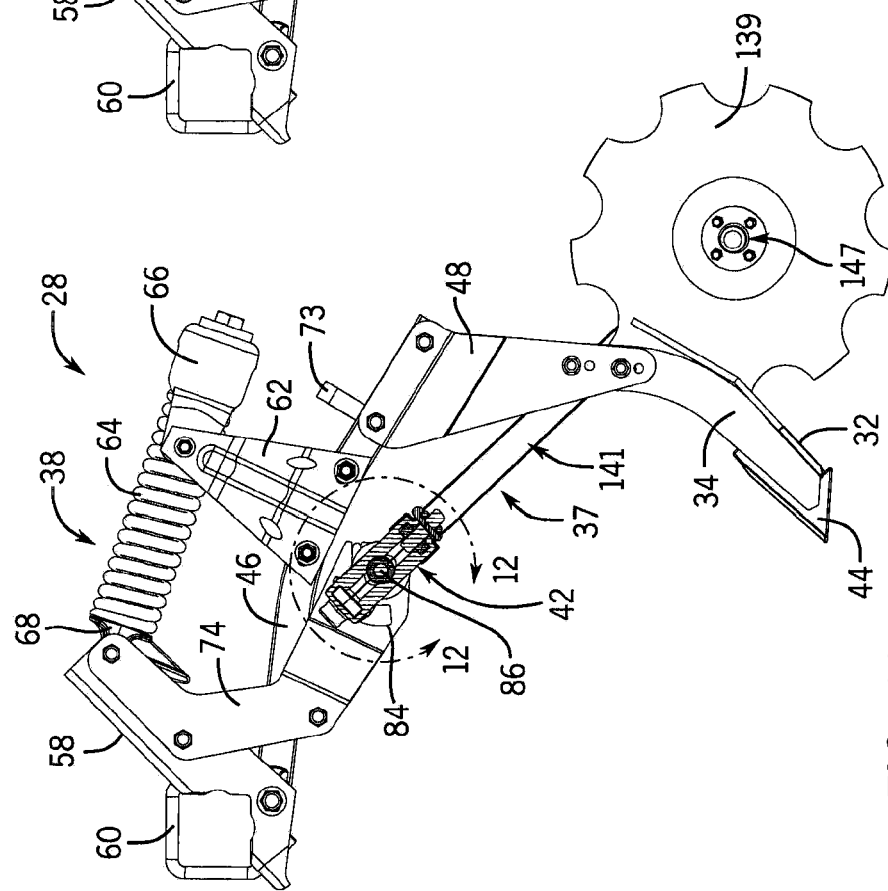

ADJUSTABLE DISK MOUNTING ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural implements, and in particular to implements having disk assemblies, such as the closing disks for closing a furrow or trench.

BACKGROUND OF THE DISCLOSURE

Certain agricultural implements and machines, such as planters and nutrient applicators, till rows of soil to allow for seeds, fertilizers and the like to be embedded underground. Typically such implements and machines have an applicator mechanism and one or more upstream shank or injector knives that cut through the ground and create a trench or furrow into which the products are deposited.

A farmer's ability to efficiently and effectively carry out such operations is highly dependent upon various environmental and operational factors, for example including soil conditions (e.g., plant residue flow), ground travel speed and seal time between furrow opening and closing. Soil that is low in plant residue, such as loam (i.e., soil heavy in sand, silt and clay), allows for more rapid furrow seal time provided the planter mechanism is configured with the closing disks in close proximity to the furrow shank or injector knife. Hard soil that is high in plant residue requires increased furrow closing time to allow time for the plant residue to flow from the furrow, and thus the closing disks must be physically spaced from the knife to a greater extent to provide for the increased closing time needed to capture enough soil to adequately seal the furrow.

Some conventional nutrient applicator implements, for example, have a knife mounted in a fixed position relative to a pair of closing disks, which are mounted downstream from the knife away from the direction of travel. Such fixed mounting arrangements do not readily allow for adjusting furrow closing times depending on soil conditions and/or the speed of travel. This can cause various inefficiencies in the application process, for example, the escape of the gaseous nutrient composition prior to furrow sealing. To address this problem the travel speed of the nutrient applicator implement must be coordinated closely with the spacing of the closing disks from the knife. Speed fluctuations are therefore problematic. Overall changes in travel speed require remounting of the closing disks and/or the knife. Some conventional nutrient applicators allow for limited adjustment of the position of the close disks relative to the knife. However, the adjustments typically required tools, were limited to simple pivotal movement or lacked discrete settings for fixing disk position. The difficulty and limited adjustment often led to farmers continuing to operate the implement in the same position when working fields of different soil characteristics. The resulting application impairment in turn adversely affected productivity.

SUMMARY OF THE DISCLOSURE

An adjustable disk assembly, such as a closing disk assembly for an agricultural tillage implement, is disclosed that readily allows for manual selection of disk home positioning with or without pivotal mounting of the disks.

In one aspect, the disclosure provides a disk assembly for an agricultural implement having a support frame and a ground engaging member. The assembly includes a disk rotatably mounted to an associated support arm, a disk mount providing a plurality of mounts each configured to couple the support arm to the frame, and a mounting pin releasably coupled to one of the plurality of mounts. At least some of the plurality of mounts are disposed at different positions so as to selectively mount the disk in one of a plurality of different home positions with respect to the ground engaging member.

In another aspect, the disclosure provides a disk assembly for an agricultural implement having a support frame and a ground opening member coupled to the support frame. The assembly includes a first disk mount coupled to the support frame and having a first pair of receptacles opening to a first side of the ground opening member, and a second disk mount coupled to the support frame and having a second pair of receptacles opening to a second, opposite side of the ground opening member. The assembly also includes first and second closing disks mounted to respective first and second support arms and spaced apart at opposite sides of the ground opening member. The support arms can be configured to be coupled to the disk mounts in which the first support arm is received in one of the first mounting receptacles and the second support arm is received in one of the second mounting receptacles. One or more tool-less fasteners releasably connect the support arms to the disk mounts. At least one of the disk mounts and the support arms are configured with multiple mounting locations for coupling to the fasteners. The mounting locations are spaced differently from the ground opening member for varying the spacing between the closing disks. The mounting locations are used to set multiple home positions for each closing disk in which each home position differs with respect to the ground opening member.

In yet another aspect, the disclosure provides a disk assembly in an agricultural implement having a ground opening member mounted to a support frame. The disk assembly has a spring-biased pivot mechanism coupled to the support frame. A pair of disk mounts are coupled to the pivot mechanism for pivotal movement with respect to the support frame. The disk mounts have a first pair of mounting receptacles opening to a first side of the ground opening member, and a second pair of mounting receptacles opening to a second, opposite side of the ground opening member. The receptacles of each pair are spaced apart in a fore/aft dimension and a height dimension. The disk mounts include at least one mounting opening that communicates with each of the receptacles. First and second closing disks are mounted to respective first and second support arms and spaced apart on the opposite sides of the ground opening member. The first support arm is configured to be received in one of the first pair of receptacles, and the second support arm is configured to be received in one of the second pair of receptacles. The first and second support arms each have at least one mounting opening. First and second mounting pins are configured to be received in associated pairs of the mounting openings of the support arms and the disk mounts for releasably securing the support arms in the associated receptacles of the disk mounts. The mounting pins are used to set a home position of each closing disk at a particular fore/aft distance, height and lateral spacing with respect to the ground opening member.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 2 is a perspective view of a ground opening member and closing disk assembly thereof incorporating an example adjustable disk mounting assembly, with the disk assemblies each shown in a home position "A";

FIG. 3 is a partial enlarged view thereof showing the example adjustable disk mounting assembly close-up;

FIG. 6 is a side view of the ground opening member and closing disk assembly shown in FIG. 2;

FIG. 7 is a rear view thereof;

FIG. 8 is an enlarged partial view from the perspective of line 8-8 of FIG. 6 showing the example adjustable disk mounting assembly close-up;

FIG. 9 is view similar to FIG. 8 in front view from the perspective of line 9-9 of FIG. 6;

FIG. 10 is a sectional view taken along line 10-10 of FIG. 2;

FIG. 11 is a side sectional view taken along line 11-11 of FIG. 2;

FIG. 12 is a partial enlarged sectional view showing the area defined by arc 12-12 of FIG. 11;

FIG. 13 is a view similar to FIG. 11, but showing one disk assembly mounted in a home position "C";

Like reference numerals in the drawings indicate like components, parts, or operations.

DETAILED DESCRIPTION

Figure 1:
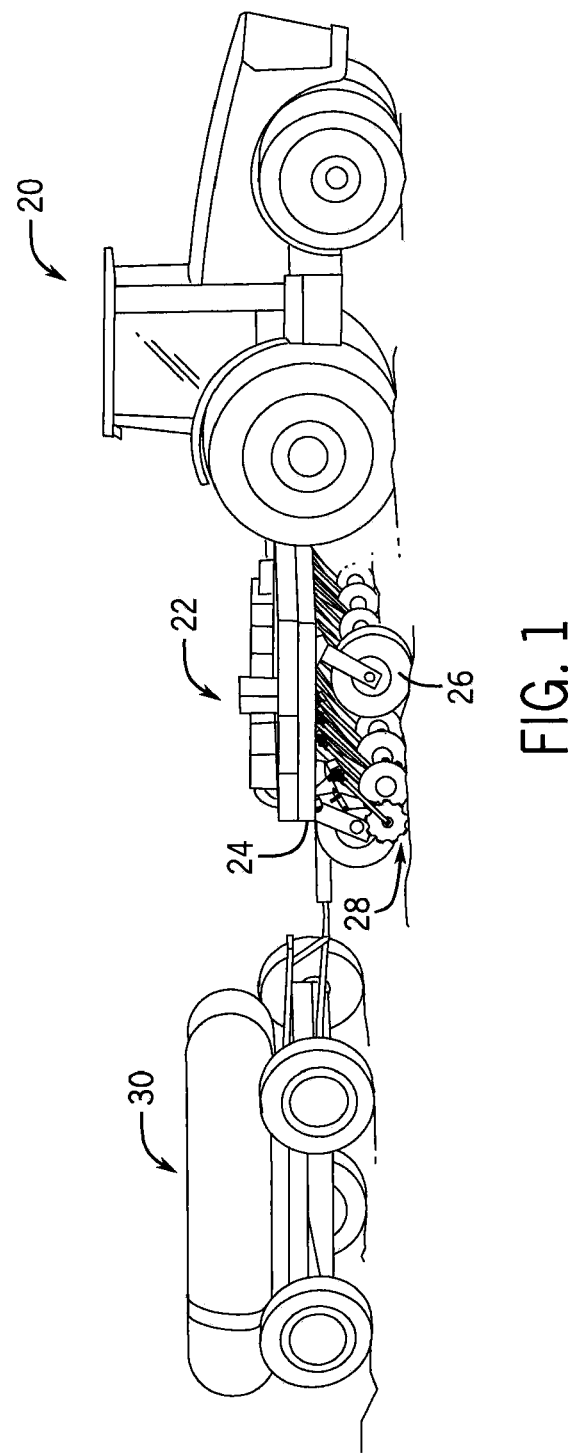
FIG. 1 is a side view of an example work vehicle in the form of an agricultural tractor pulling an agricultural implement in the form of a nutrient applicator having an adjustable disk mounting assembly according to the present disclosure.

The following describes one or more example embodiments of the disclosed adjustable disk mounting assembly, as shown in the accompanying figures of the drawings described briefly above.

As also discussed above, for various agricultural equipment with rotatable or non-rotatable disk assemblies, such as various tillers, rippers, seeders and nutrient applicators, disk positioning is often critical to proper soil management and operation of the implement. Disks positioned to interact with ground of a particular character (e.g., clay, silt, and plan residue content) may be unsuitable for ground having a different mix of these or other characteristics. Thus, it is often imperative, or at least convenient, to have the disk assemblies be adjustably mounted to the implement. Rapid, tool-less manual adjustment further enhances the operator's ability to account for changed ground conditions in the field without compromising productivity or efficacy. This disclosure addresses these and other concerns and provides various implementations in which the disk assemblies can be adjustably mounted to vary the home positioning of each disk.

Tool-less adjustments can be made by hand without the use of tools, such as screw drivers, wrenches, pliers, or hammers and so on. For example, a disk can be mounted by hand by inserting a mounting pin into a hole, slot or other opening at a particular mounting location. The disk can then be adjusted by hand by first removing the pin, re-positioning the disk (along with other mounting components), and inserting the mounting pin into a hole, slot or opening at another location to mount the disk at its new location. The use of "mounting pin" herein encompasses other forms of tool-less fasteners, including without limitation snap buttons, spring pins, clevis pins, cotter pins, dowel/grooved pins that go into a slot, tapered dowel pins, ball-detent pins, key lock pins, pin and lanyard assemblies as well as thumb screws, clevis fasteners, split pins, hitch pins with an R-clip, and so on.

As also mentioned above, in certain agricultural operations, such those involving a furrowing or trenching action, effective operation is highly dependent upon an equipment set up (e.g., disk positioning) appropriate for ground conditions. Specifically, ground having soil that is low in plant residue, such as loam, dictates more rapid furrow seal time. Hard soil that is high in plant residue requires increased furrow closing time to allow time for the plant residue to flow from the furrow. Thus, the furrow closing disks must be located at different relative positions with respect to the ground opening member (e.g., tillage shank or injector knife) to provide for the increased or decreased closing time needed to capture more or less soil, more or less quickly, to adequately seal the furrow. The temporal aspect of proper furrow closing thus dictates that vehicle travel speed also factors into effective operation. In other words, disk positioning is not only dependent on ground conditions, but also on travel conditions. Variations in vehicles and/or variations in instantaneous or average vehicle speed resulting from any number of factors (e.g., terrain, weather conditions, operator skill, and so on) affect operation. Without quick and adequate disk positioning to account for variable travel speeds, even without varying ground conditions, the effectiveness and productivity of the operation will be adversely impacted.

The following is a discussion of one or more example assemblies providing manual disk position adjustment for any of various agricultural implements. While the principles of this disclosure are applicable to various disk arrangements, the drawings and the following discussion, describe a particular example adjustable closing disk mounting assembly for a nutrient applicator. As shown in FIG. 1, a work vehicle, shown as tractor 20, pulls an agricultural implement, shown as a nutrient applicator 22, having a main frame 24 of interconnecting tubular frame members, supporting gangs of forward disks 26 at the leading end, and gangs of row unit disk assemblies 28 at the trailing end. A nutrient supply tank 30 is hitched to the main frame 24 so it can be towed along with the nutrient applicator 22 by the tractor 20.

As will be understood, the nutrient applicator 22 is used to inject nutrients from the supply tank 30 through an injector nozzle 32 coupled to the supply tank 30 via one or more plumbing lines (not shown). The injector nozzle 32 is coupled to each row unit disk assembly 28 at a low position, near the ground in order to inject the nutrients in the open furrow immediately after it is formed, and thereby minimize the chance of improper application and waste. The nutrients can be any form of dry, liquid or anhydrous fertilizer, such as an anhydrous ammonia, which is stored in the supply tank 30 under pressure in a liquid state and is released in a gaseous state into the soil.

It should be noted that while a particular nutrient applicator 22 is shown and described herein, the principles of the disclosure could be applied to any of the various known nutrient applicators, including the line of nutrient applicators commercially available from Deere & Co. of Moline, Ill. Moreover, the principles of the disclosure can also be utilized in other platforms and applications, for example, including non-nutrient applicators (e.g., pesticide applicators, seed planters, etc.) and in other tillage implements that work the soil without also embedding an additive or planted material into the soil (e.g., various disks, tillers, rippers and so on). The described embodiments are thus not limiting of the disclosure. Furthermore, reference to a tillage "shank," "disks" and "closing disks" is also not limiting, as the present disclosure is applicable to any type of implement, such as having one or more fixed or rotatable ground-engaging members, including various disks, coulters, cleaner blades, chisel plows and so on, each having any suitable configuration, for example in the case of a disks having a flat, convex or concave circular configuration with a continuous, serrated or scalloped periphery.

Referring now to FIGS. 2, 4, 6 and 7, in the nutrient applicator example illustrated, each row unit disk assembly 28 includes as major components a ground opening member 34, a pair of closing disk assemblies 36, 37, a recoil assembly 38, return assembly 40, and a pair of adjustable mounting assemblies 42, 43. The ground opening member 34 in the illustrated example is in the form of a non-rotating tillage knife or shank, referred to herein as "shank 34." However, as mentioned, the ground opening member may be a furrower, coulter, plow or other stationary ground-engaging member as well as any suitable rotatable member, such as a sharp-edged cutting disk. In the illustrated example the shank 34 has a long, narrow, angled body with a pointed distal end and a sharpened leading knife edge attachment 44 for cutting into the ground. The leading side of the shank 34 corresponds to the forward direction of travel of the tractor 20 and nutrient applicator 22 (i.e., fore direction or dimension), and the trailing side corresponds to opposite the direction of travel (i.e., aft direction or dimension). The height of the shank 34 corresponds to its elevation (vertical or otherwise) with respect to the ground.

The shank 34 can be mounted to an elongated pivot arm 46 via a pair of brackets 48, 49 to support the shank 34 generally at a right angle to the pivot arm 46. The pivot arm 46 has a tubular end 50 housing a cylindrical bushing 52, which receives a pivot pin 54 extending along a pivot axis 56. The pivot pin 54 fits into corresponding openings in the sides walls of a channel member 58 to pivotally couple the pivot arm 46. The channel member 58 can have an inverted U-shape with an open side that accommodates the pivot arm 46. The channel member 58 connects to a gang bar (not shown) of the frame 24 via a channel clamp 60, which can be secured to the channel member 58 by a threaded connection (e.g., nuts threaded onto its threaded ends). Brackets 62, 63 connected to an intermediate part of the pivot arm 46 couple the pivot arm 46, and thereby the shank 34, to the recoil assembly 38.

Figure 18:
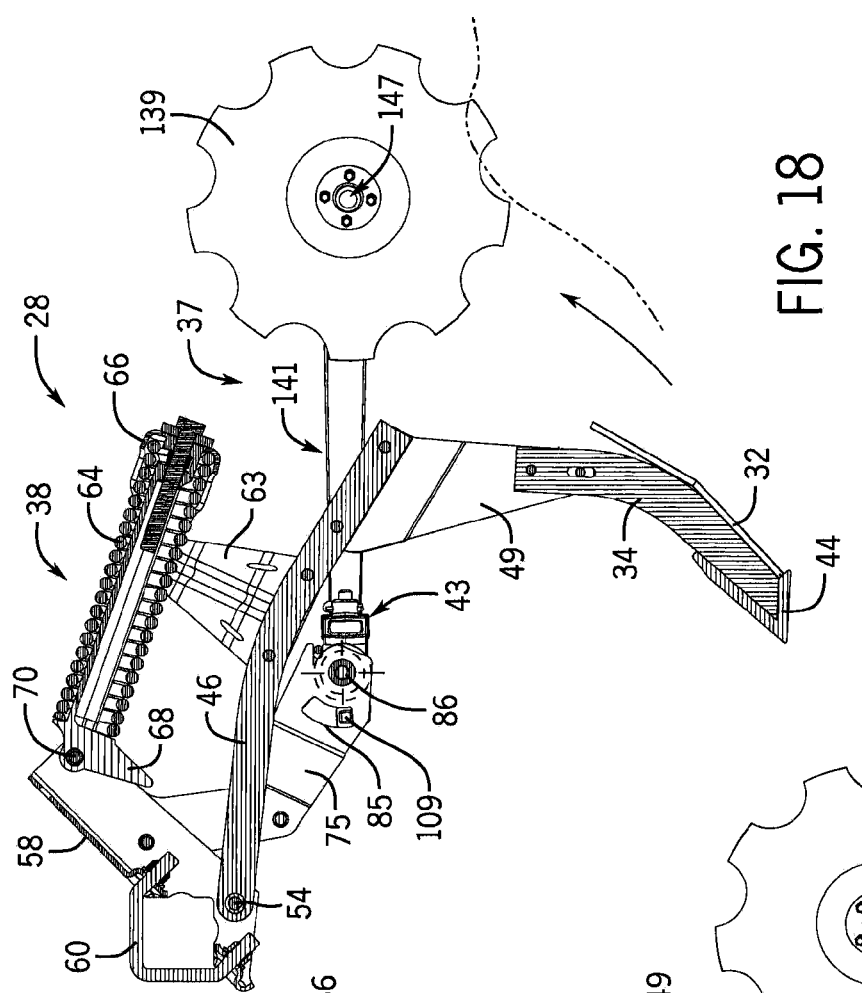
FIG. 18 is a view similar to FIG. 17 showing the associated disk assembly pivoted from the home position "A" to a maximum pivoted position.
Figure 17:
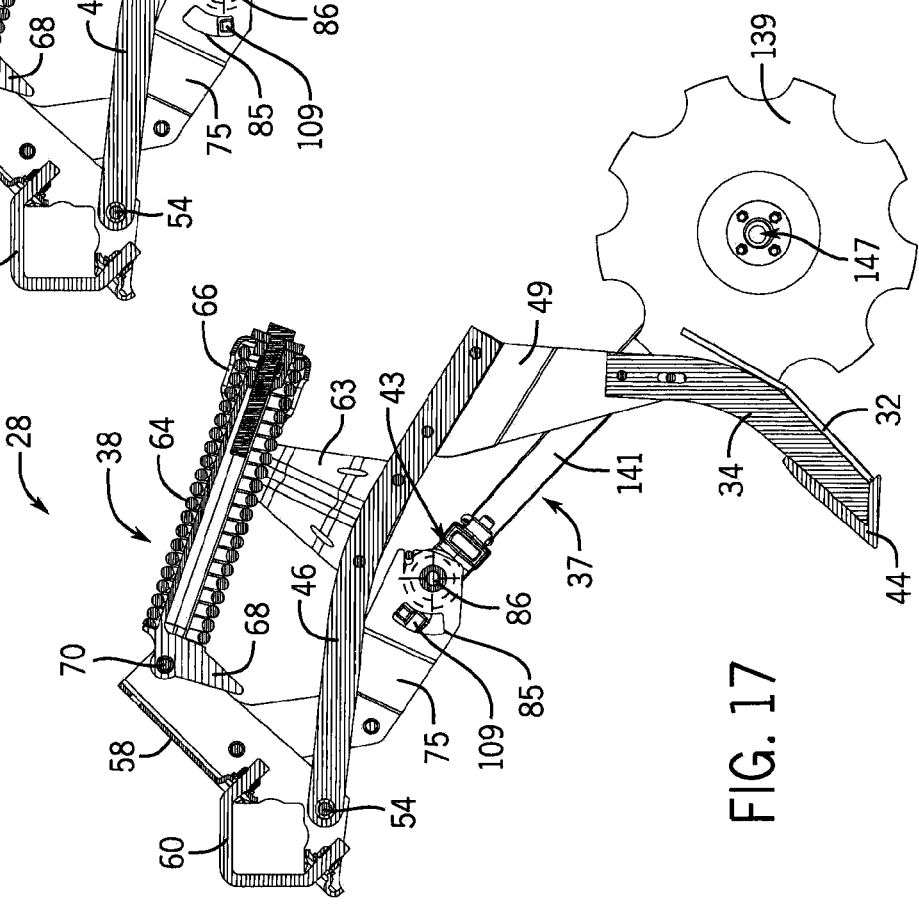
FIG. 17 is a side sectional view taken along line 17-17 of FIG. 2.

The recoil assembly 38 includes a coil spring 64 with a mounting collar 66 at one end and a mounting flange 68 at the other end. The mounting collar 66 bolts to the brackets 62, 63 to coupled one end of the coil spring 64 to the pivot arm 46. The mounting flange 68 couples to the channel member 58 by another pivot pin 70, which fits through a cylindrical end of the mounting flange 68 and corresponding openings in the sides of the channel member 58 and extends along another pivot axis 72 to pivotally couple the other end of the coil spring 64 to the channel member 58. This arrangement allows the shank 34 to pivot with the pivot arm 46 about the pivot axis 56 via the pivot pin 54 with respect to the frame 24, as shown in FIG. 18, during impact events with rigid parts of the ground, such as a rock or other obstacles, thus providing a shock-absorbing function. Further, the coil spring 64 provides a biasing force resisting pivoting of the pivot arm 46, and thereby provides a return function, in order to keep the shank 34 in a home position, such as would be in contact with the ground during use, as shown in FIG. 17. Yet, the coil spring 64 permits the pivot arm 46, and thus the shank 34, to pivot temporarily when the spring force is overcome (e.g., during an impact event), after which the shank 34 is returned to the home position. Additionally, a manual pull 73 with a finger loop can be attached to the pivot arm 46 to aid in raising the shank 34 manually if desired.

Two generally C-shaped angled brackets 74, 75 connect at one end to the channel member 58. Spacer sleeves 76 fit onto the pivot pin 70 and mounting pin 78 and extend between the sides of the channel member 58. At the other, free end the brackets 74, 75 have respective pivot rod holes 80, 81, notches 82, 83, and arcuate slots 84, 85. At the free end, the brackets 74, 75 mount the return assembly 40, and thereby the two adjustable mounting assemblies 42, 43 and in turn the closing disk assemblies 36, 37, as will now be described.

Figure 4:
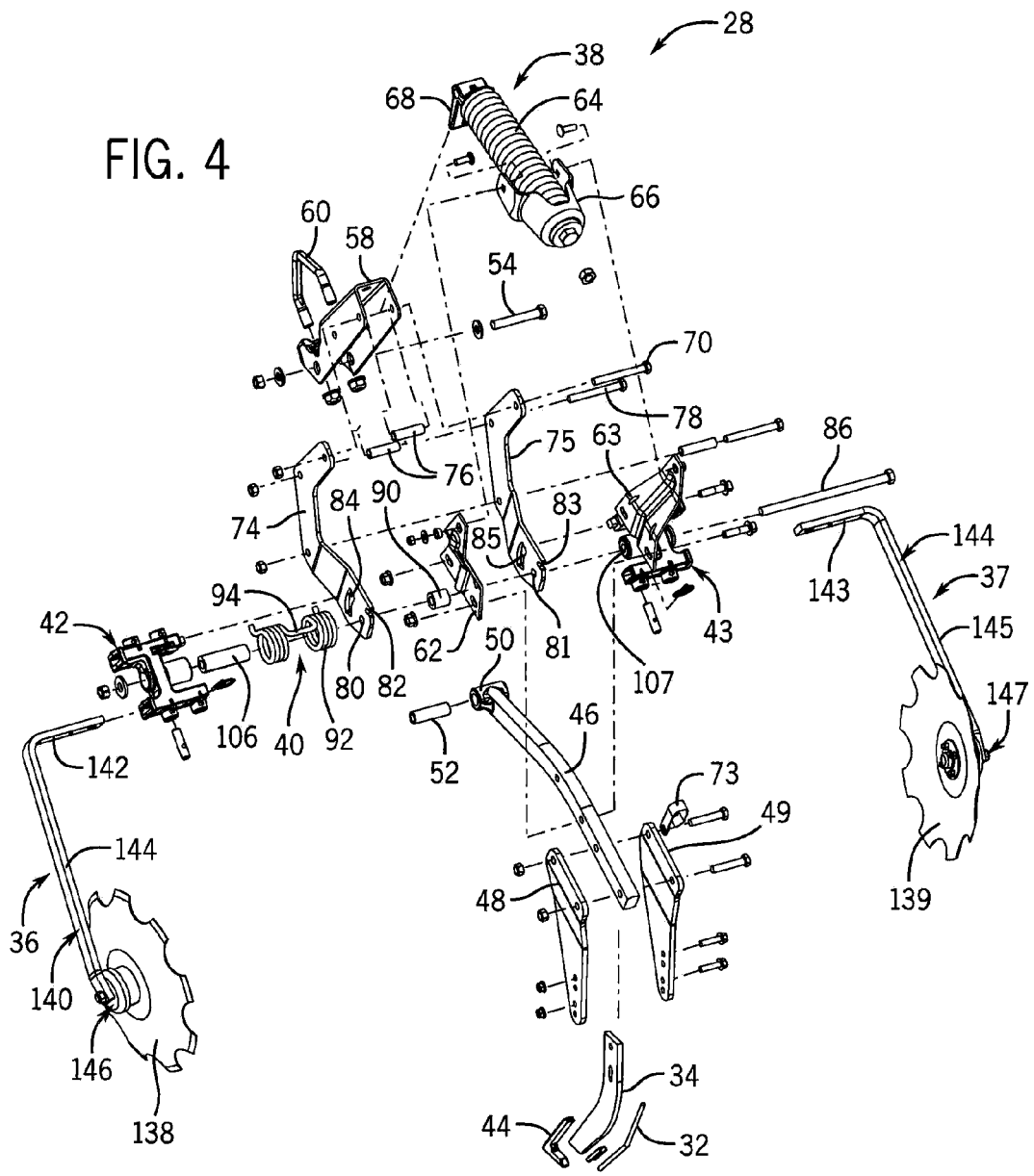
FIG. 4 is an exploded perspective view of the ground opening member and closing disk assembly of FIG. 2.

A pivot rod 86 extends along pivot axis 88 through the pivot rod holes 80, 81 and a central spacer sleeve 90 located between the two angle brackets 74, 75. A torsion spring 92 mounts over the pivot rod 86 and interacts with the adjustable mounting assemblies 42, 43 to provide the return function of the return assembly 40, which generally maintains the closing disk assemblies 36, 37 in their home positions, for example in contact with the ground and aft of the shank home position in the direction of travel of the tractor 20. The torsion spring 92, as illustrated in FIG. 4, can be a double torsion spring having a staple 94 between two torsion spring segments. It will be appreciated that alternatively, two single torsion springs may be used. The torsion spring 92 is coupled on each end to the adjustable mounting assemblies 42, 43, the staple 94 is received in notches 82, 83 of the respective brackets 74, 75. Pivoting about the pivot rod 86 is permitted when the spring force of the torsion spring 92 is overcome, after which, the adjustable mounting assemblies 42, 43, and thereby the closing disk assemblies 36, 37, are returned to their home (or non-pivoted) positions. The torsion spring 92, in the form of a double torsion spring, allows the adjustable mounting assemblies 42, 43, and thereby the closing disk assemblies 36, 37, to rotate independently of one another as well as independently of the shank 34, as shown in FIG. 18. Independent rotation may occur, and thus be advantageous, when only either of the closing disk assemblies 36, 37, or the shank 34, encounters a higher or more rigid part of the ground, or when these components encounter such parts of the ground at different times.

Figure 5:
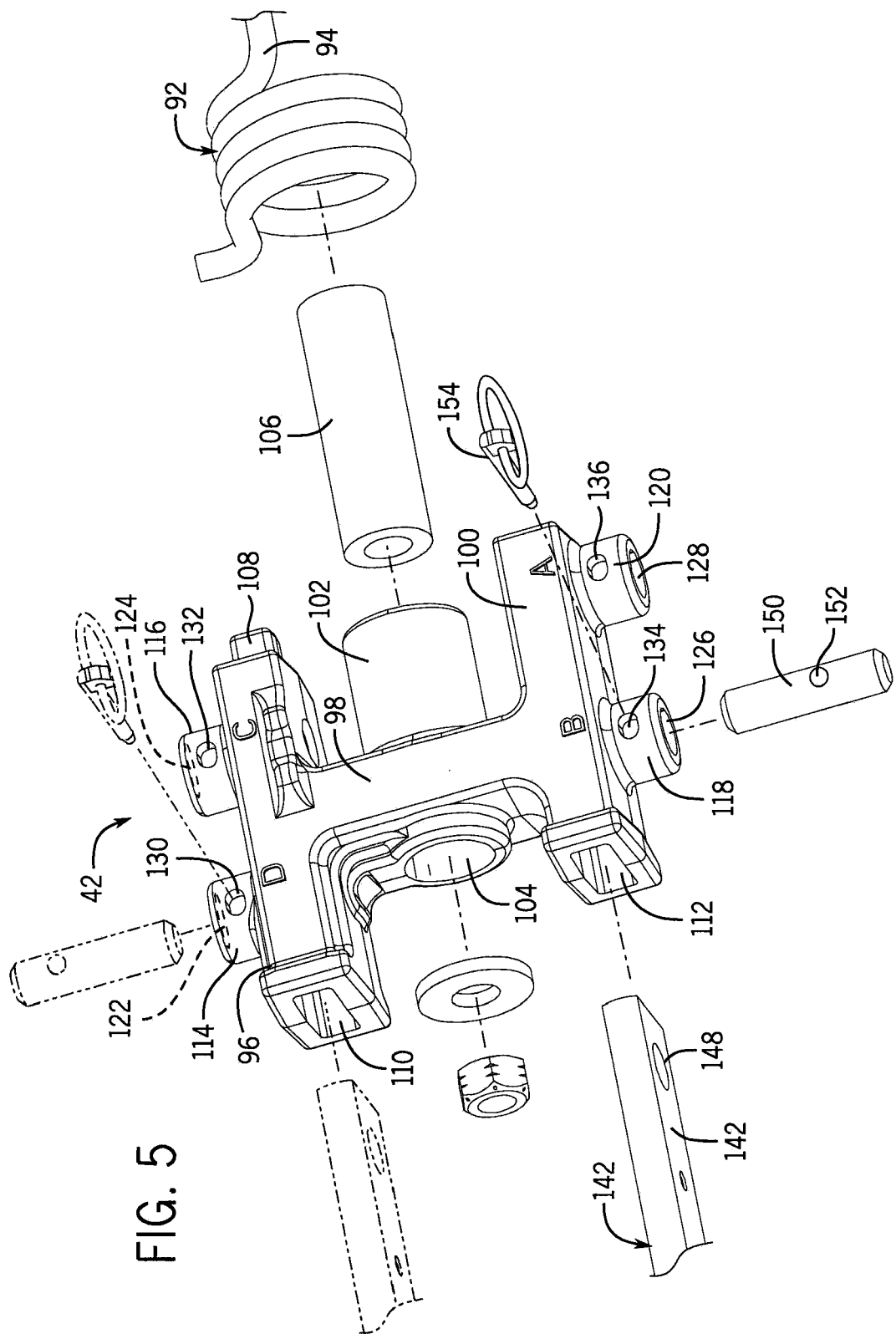
FIG. 5 is an enlarged exploded perspective showing a portion of the example adjustable disk mounting assembly close-up.

The adjustable mounting assemblies 42, 43 can be of the same or different configuration. Referring now also to FIGS. 3 and 5, the illustrated adjustable mounting assemblies 42, 43 have the same configuration, each with an upper lateral receptor segment 96, 97, a middle connecting segment 98, 99, and a lower lateral receptor segment 100, 101. The middle segments 98, 99 may each have a hollow cylindrical collar 102, 103 and through bores 104, 105 passing through the interior of the middle segments 98, 99. The coiled ends of the torsion spring 92 fit onto the collars 102, 103, and bushing sleeves 106, 107 fit into the respective bores 104, 105. The pivot rod 86 fits within the busing sleeves 106, 107 and spacer sleeve 90 and may be releasably secured on one end by a fastener, such as a nut and washer, a snap ring, or retaining pin. The mounting brackets 74, 75 are positioned such that the pivot rod 86 is sufficiently below the pivot arm 46 to allow the shank 34 and pivot arm 46 to pivot upward without contacting or interfering with the pivot rod 86.

Referring also to FIGS. 10-13, the adjustable mounting assemblies 42, 43 may each have a limiting pin 108, 109 extending inwardly into the arcuate slots 84, 85 in the brackets 74, 75, respectively. The limiting pins 108, 109 and the slots 84, 85 may limit the angle of rotation of the adjustable mounting assemblies 42, 43, and thereby the closing disk assemblies 36, 37. For example, FIG. 17 illustrates the closing disk assembly 37 in a certain home position. FIG. 18 illustrates the closing disk assembly 37 in a maximum rotated state, as shown by the engagement of the limiting pin 109 with the upper end of the slot 85, after the torsion spring force was overcome. In the illustrated example, the slots 84, 85 are sized to allow approximately a 45 degree angle of rotation. As will be understood, however, longer slots would permit a larger angle of rotation, while short slots would allow a smaller angle of rotation.

As shown in FIG. 5, the receptor segment 96 of the adjustable mounting assembly 42 has a receptacle 110 passing at least partially through the receptor segment 96 in a lateral direction, and the receptor segment 100 has a receptacle 112 passing at least partially through the receptor segment 100 in a lateral direction. The receptor segments 96, 100 each have two raised mounts 114, 116 and 118, 120, respectively, each with a respective mount opening 122, 124, 126, 128, that may pass through its respective receptor segment 96, 98 and receptacle 110, 112. As shown in FIGS. 8 and 9, the adjustable mounting assembly 43 may be a mirror image of the adjustable mounting assembly 42, and thus have receptacles 111, 113, mounts 115, 117 and 119, 121, and mount openings 123, 125, 127, 129, respectively. The mounts 114-121 can each have a respective retaining pin hole 130-137. It will be appreciated that mounts 114-121 may be arranged at different lateral distances from the shank 34. For example, as shown, the mounts 114, 116, 118 and 120 may each be located at a different lateral distance to allow for four different home positions for each closing disk assembly 36, 37.

With reference to FIGS. 2 and 4, the closing disk assemblies 36, 37 will now be described. The closing disk assemblies 36, 37 each include respective closing disks 138, 139 each rotatably mounted to the free end of a support arm 140, 141. The illustrated support arms 140, 141 are each a single, bent flat bar member. However, the support arms can have a variety of cross-sectional shapes, such as rectangular, square, or circular, and the cross sectional shape may vary across the length of the support arm. The support arms 140, 141 are each bent at a generally right angle define respective short 142, 143 and long 144, 145 segments. The closing disks 138, 139 are coupled to the respective long segments 144, 145 by a pivot pin and bearing assembly 146, 147, or any other suitable means, including a non-rotatable connection.

The free ends of the short segments 142, 143 interface with the respective adjustable mounting assemblies 42, 43, such as shown in FIGS. 2 and 5. The short segments 142, 143 can have one or more support arm mount openings, such as respective openings 148, 149, which can be in the form of a simple hole. Of course, such support arm mount openings may also be in the form of a slot to provide for continuous lateral adjustment at these openings. The support arm mount openings may also be a through, or partial opening of a different configuration that allows for discrete positioning or continuous or incremental adjustability at these openings.

Like the adjustable mounting assemblies 42, 43, the closing disk assemblies 36, 37 may be generally mirror images of each other. In the illustrated example, the closing disks 138, 139 and support arm arrangements 140, 141 are in opposed relation about a central plane that extends in the fore/aft dimension of the tractor 20 and nutrient applicator 22. Moreover, the closing disks 138, 139 are canted with respect to their support arms 140, 141 at an angle with regard to the direction of travel of the tractor 20. This results in a generally "V" shaped gap formed therebetween and also the forward portions, closest to the shank 34 of the closing disks 138, 139 being closer together than the aft portion, farthest from the shank 34. This orientation of the disks 138, 139 creates a funnel to direct at least some of the soil displaced by the shank 34 back into the furrow. Of course, other angular orientations than that shown are contemplated, including a generally parallel arrangement of the closing disks.

The closing disk assemblies 36, 37 can be coupled, without the need for tools, to the respective adjustable mounting assembly 42, 43 by sliding the short segment 142, 143 of the respective support arm 140, 141 into the desired receptacle 110, 111 or 112, 113, and then aligning the support arm mount openings 148, 149 with one of the mount openings 122-129. A mounting pin 150, 151 can then be inserted through the selected mount openings 122-129 and the support arm mount openings 148, 149. The mounting pins 150, 151 may be secured by aligning the retaining pin hole 130-137 of the associated mount opening 122-129 with a retaining pin hole 152, 153 in the mounting pin 150, 151, respectively, and inserting a releasable retaining pin 154, 155 into these aligned holes. The closing disk assemblies 36, 37 may similarly be decoupled without tools from the adjustable mounting assemblies 42, 43 by first removing the retaining pins 154, 155 and then the mounting pins 150, 151 from the adjustable mounting assemblies 42, 43 and the closing disk assembly 34. It should be noted that other types of adjustable mounting connections may be suitable. For example, threaded fasteners and openings (e.g., a bolt and tapped hole or nut) may be used instead of mounting pins 150, 151 and retaining pins 154, 155.

Figure 14:
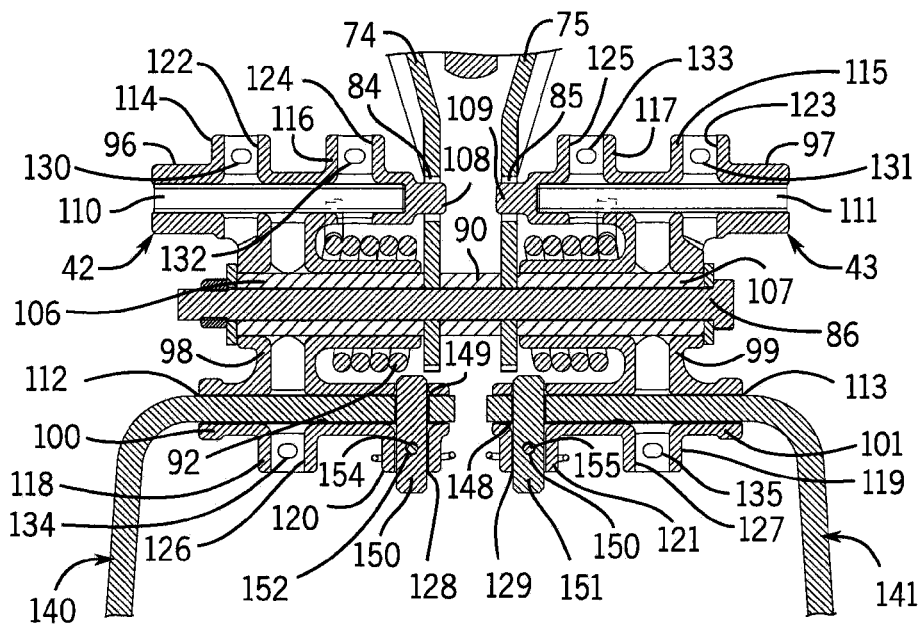
FIG. 14 is a partial enlarged front sectional view showing a portion of the example adjustable disk mounting assembly defined by area 14-14 of FIG. 10 close-up and with each disk assembly in the home position "A"
Figure 15:
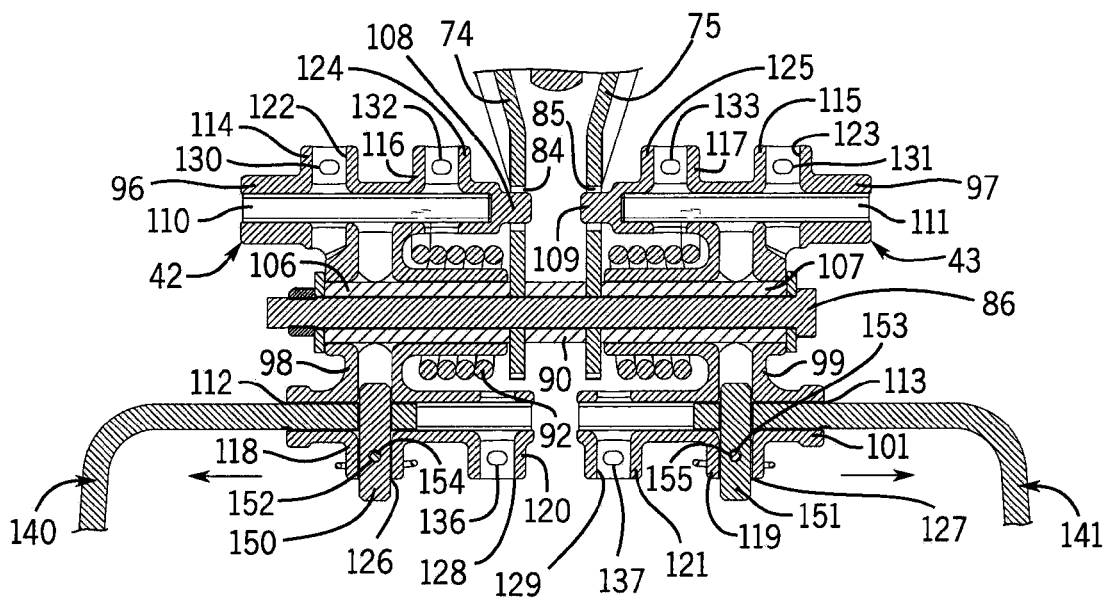
FIG. 15 is a view similar to FIG. 14, but showing each disk assembly in a home position "B"
Figure 16:
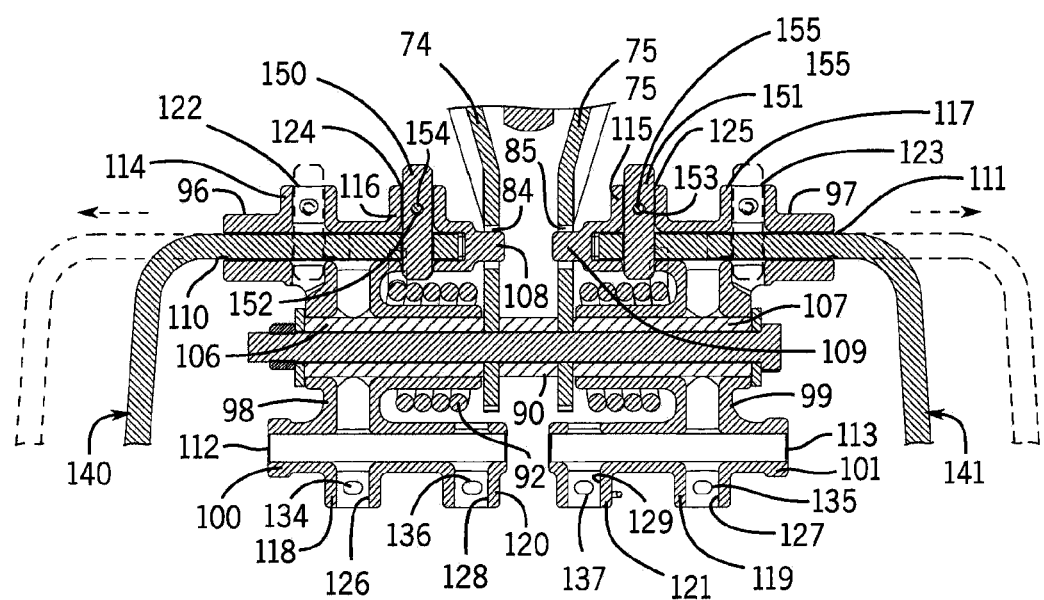
FIG. 16 is another view similar to FIG. 14, but showing each disk assembly in the home position "C", and each disk assembly is further shown in phantom in a home position "D"

Moreover, as illustrated in FIGS. 14-16, the lateral position (i.e., side to side location) and the fore/aft position (i.e., front to back location) of the closing disk assemblies 36, 37 may be adjusted relative to the shank 34 into one of multiple home positions. For example, as shown in FIGS. 14 and 16, an operator of the tractor 20 may increase or decrease the fore/aft distance between shank 34 and the closing disks 138, 139 to increase or decrease the closing time of the furrow for various soil and travel conditions. The operator may also (or instead) increase or decrease the lateral spacing between each of the closing disks 138, 139 and the shank 34, as shown between FIGS. 14 and 15, to capture more or less soil. The closing disk assemblies 36, 37 can be arranged symmetrically or asymmetrically with respect to the shank 34 (or the central fore/aft plane). These operations will be now described in more detail.

FIGS. 14-16 show that the lateral position of the closing disk assemblies 36, 37 may be adjusted by selecting an appropriate mount 114, 116, 118, 120 of the adjustable mounting assembly 42, each associated with a different home position "A," "B," "C," and "D". Similarly, mounts 115, 117, 119, 121 of the adjustable mounting assembly 43 are each associated with a different home position "A," "B," "C," and "D". For example, to move the closing disks 138, 139 closest laterally to the shank 34, the support arm mount openings 148, 149 can be aligned with respective mount openings 128, 129 (shown as "A" in FIGS. 8 and 9). To move the closing disks 138, 139 farthest laterally from the shank 34, the support arm mount openings 148, 149 can be aligned with the mount openings 122, 123 (shown as "D" in FIGS. 8 and 9). FIG. 16 in particular shows that moving the closing disk assemblies 36, 37 from mounts 116, 117 to mounts 114, 115 increases the lateral distance between the shank 34 and the closing disks 138, 139 without also changing their relative heights. As will be understood, intermediate lateral positions of the closing disks 36, 37 can be achieved by selecting the mounts associated with positions "B" and "C". Again, it will be appreciated that the closing disk assembly 36 may be moved independently from the closing disk assembly 37, such that the lateral distance between the closing disk 138 and the shank 34 is different than the lateral distance between the closing disk 139 and the shank 34. This may be accomplished in a variety of ways, such as attaching the support arm 138 to an "A" mount and support arm 139 to a "B" mount (although any combination is possible "A" and "B," "A" and "C," "A" and "D," "B" and "C," "B" and "D," or "C" and "D").

FIG. 14 depicts an arrangement of the closing disk assemblies 36, 37 and the adjustable mounting assemblies 42, 43 for achieving a disk position relative to the shank 34, which picks up less displaced soil and closes slower. An operator may achieve this position by inserting the support arms 140, 141 into the receptacles 112, 113 until the support arm mount openings 148, 149 align with the mount openings 120, 121, respectively. The mounting pins 150, 151 may be inserted through the aligned openings 120, 121 and 148, 149 until the associated retaining pin holes are axially and radially aligned. The retaining pins 154, 155 are then fully interested into the retaining pin holes to restrain axial and rotational movement of the mounting pins 150, 151, which in turn prevents lateral movement of the support arms 140, 141.

Referring now also to FIG. 15, the support arms 140, 141 may easily be adjusted without tools from one lateral position to another, such as to increase the lateral distance between the closing disks 138, 139. The retaining pins 154, 155 are removed from the retaining pin holes of the associated mounts and mounting pins to allow the mounting pins 150, 151 to be removed. The support arms 138, 139 no longer being retained by the mounting pins 150, 151, are slid laterally outward away the shank 34 until the respective support arm mount openings 148, 149 is aligned with the mount openings 126, 127. The mounting pins 150, 151 are then reinserted into the mount openings 126, 127 until the associated retaining pin holes are aligned axially and radially. The retaining pins 154, 155 are then reinserted.

To decrease the time it takes to close the furrow created by the shank 34, the closing disks 138, 139 can be moved from a position farther aft of the shank 34, such as shown in FIG. 11, forward to a position closer to the shank 34, such as shown in FIG. 13. Like lateral adjustment of the closing disk assemblies 36, 37, the fore/aft adjustment may be accomplished without tools, and depending on the arrangement of the mounts may occur at simultaneously with the lateral adjustment. For example, decreasing the closing time is accomplished by moving the support arms 138, 139 from the position shown in FIG. 14 to the position shown in FIG. 16. The retaining pins 154, 155 are removed as described above, and the mounting pins 150, 151 are slid out from the mount openings 128, 129. One or both of the support arms 138, 139 are slid laterally out of the receptacles 112, 113 and then are inserted into receptacles 110, 111. The support arms 138, 139 are slid in until the openings 148, 149 align with respective mount openings 124, 125. The mounting pins 150, 151 are then inserted as are the retaining pins 154, 155.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

Accordingly, various embodiments and implementations other than those explicitly described are within the scope of the following claims.

What is claimed is:

1. A disk assembly for an agricultural implement having a ground engaging implement coupled to a support frame, the disk assembly comprising:
   a first bracket coupled to the support frame on a first end and defining a pivot axis through a second end;
   a first disk rotatably mounted to a first support arm;
   a first mounting assembly pivotally coupled to the first bracket along the pivot axis;
   a first plurality of receptacles included in the first mounting assembly, the first plurality of receptacles providing a first plurality of mount openings, each of the first plurality of mount openings being configured to couple the first support arm to the support frame; and
   a first mounting pin releasably coupled to the first mounting assembly through one of the first plurality of mount openings to couple the first support arm to one of the first plurality of receptacles of the first mounting assembly;

wherein the first plurality of mount openings are disposed at different positions with respect to the ground engaging implement so as to selectively mount the first disk in a plurality of different home positions with respect to the ground engaging implement, the plurality of different home positions for the first disk varying fore/aft distance, height and lateral spacing of the first disk with respect to the ground engaging implement;

further wherein, the first mounting assembly pivots about the pivot axis.

2. The disk assembly of claim 1, further including a second disk rotatably mounted to a second support arm.

3. The disk assembly of claim 2, further including a second mounting assembly disposed on an opposite side of the ground engaging implement relative to the first mounting assembly, the second mounting assembly including a second plurality of receptacles, the second plurality of receptacles providing a second plurality of mount openings, each of the second plurality of mount openings being configured to couple the second support arm to the support frame;

wherein the first plurality of receptacles are configured to receive the first support arm and the second plurality of receptacles are configured to receive the second support arm;

wherein the second plurality of mount openings are disposed at different positions with respect to the ground engaging implement so as to selectively mount the second disk in a plurality of different home positions with respect to the ground engaging implement, the plurality of different home positions for the second disk varying fore/aft distance, height and lateral spacing of the second disk with respect to the ground engaging implement.

4. The disk assembly of claim 1, wherein the first mounting pin releasably engages the first support arm and the first mounting assembly.

5. The disk assembly of claim 1, wherein a portion of the first support arm is configured to slide into any of the first plurality of receptacles.

6. The disk assembly of claim 5, wherein the first plurality of receptacles included in the first mounting assembly includes a first receptacle and a second receptacle;

further wherein, the first plurality of mount openings includes a plurality of first receptacle mount openings positioned along the first receptacle and a plurality of second receptacle mount openings positioned along the second receptacle.

7. The disk assembly of claim 6, wherein the first receptacle is spaced apart in at least one of a height dimension and a fore/aft dimension compared to the second receptacle relative to the ground engaging implement.

8. The disk assembly of claim 6, further comprising at least one first support arm mount opening included in the first support arm;

wherein the first mounting pin is configured to extend through the at least one first support arm mount opening and at least a portion of a selected one of the plurality of first and second receptacle mount openings aligned with the first support arm mount opening to couple the first support arm to one of the first plurality of receptacles of the first mounting assembly.

9. The disk assembly of claim 8, wherein the first mounting pin is disposed within the first support arm mount opening and the selected one of the plurality of first and second receptacle mount openings aligned with the first support arm mount opening.

10. The disk assembly of claim 1, further including a pivot mechanism having at least one pivot rod rotatably coupling the first mounting assembly to the support frame and having at least one spring biasing the first mounting assembly to maintain the first disk in one of the plurality of different home positions for the first disk.

11. The disk assembly of claim 1, wherein the ground engaging implement is a ground opening member.

12. A disk assembly for an agricultural implement having a support frame, the disk assembly comprising:
a ground opening member coupled to the frame;
a first mounting assembly coupled to the frame and having a first pair of receptacles opening to a first side of the ground opening member;
a second mounting assembly coupled to the frame and having a second pair of receptacles opening to a second side of the ground opening member opposite the first side;
a first closing disk at the first side of the ground opening member coupled to the first mounting assembly by a first support arm configured to be positioned partially within one of the first pair of receptacles;
a second closing disk at the second side of the ground opening member coupled to the second mounting assembly by a second support arm configured to be positioned partially within one of the second pair of receptacles;
fasteners for releasably connecting the first support arm to the first mounting assembly and connecting the second support arm to the second mounting assembly;
wherein the first and second mounting assemblies are configured with a plurality of mount openings for coupling the fasteners thereto;
further wherein each of the plurality of mount openings are spaced differently from the ground opening member for varying the spacing between the first closing disk, the second closing disk and the ground opening member; and
further wherein each of the plurality of mount openings are used to set different home positions for the first and second closing disks to vary fore/aft distance, height and lateral spacing between the first closing disk, the second closing disk and the ground opening member.

13. The disk assembly of claim 12, further including at least one return assembly coupled to the support frame;
wherein the first and second mounting assemblies are coupled to the at least one return assembly through a pivot axis defined through the first and second mounting assemblies for pivotal movement with respect to the support frame.

14. The disk assembly of claim 13, wherein the fasteners are pins and the plurality of mount openings are at least partial through-holes through the first and second mounting assemblies.

15. The disk assembly of claim 14, wherein the at least one return assembly includes:
a pivot rod coupled to the frame along the pivot axis that is generally perpendicular to the ground opening member and being disposed through at least one of the first and second mounting assemblies; and
at least one return spring applying a return pivot force to at least one of the first and second mounting assemblies for biasing at least one of the first and second closing disks to one of the different home positions.

16. The disk assembly of claim 13, wherein the plurality of mount openings communicate with the first and second pair of receptacles.

17. An agricultural implement having a ground opening member coupled to a support frame and a disk assembly comprising:
- a return assembly coupled to the support frame;
- first and second mounting assemblies coupled to the return assembly for pivotal movement with respect to the support frame, the first mounting assembly having a first pair of mounting receptacles opening to a first side of the ground opening member and the second mounting assembly having a second pair of mounting receptacles opening to a second side of the ground opening member opposite the first side, wherein the first pair of mounting receptacles or the second pair of mounting receptacles of each of the respective first and second mounting assemblies are spaced apart in a fore/aft dimension and a height dimension, and wherein the first mounting assembly includes a first plurality of mount openings that communicate with the first pair of mounting receptacles and the second mounting assembly includes a second plurality of mount openings that communicate with the second pair of mounting receptacles;
- a first closing disk and a second closing disk mounted to a first support arm and a second support arm respectively, the first and second closing disks spaced apart on the respective first and second opposite sides of the ground opening member, the first support arm being configured to be received in one of the first pair of mounting receptacles and the second support arm being configured to be received in one of the second pair of mounting receptacles, wherein the first support arm has a first support arm mount opening defined therethrough and the second support arm has a second support arm mount opening defined therethrough; and
- a first mounting pin configured to be received in the first support arm mount opening and one of the first plurality of mount openings of the first mounting assembly for releasably securing the first support arm in one of the first pair of receptacles of the first mounting assembly; and
- a second mounting pin configured to be received in the second support arm mount opening and one of the second plurality of mount openings of the second mounting assembly for releasably securing the second support arm in one of the second pair of receptacles of the second mounting assembly;
- wherein, the respective first and second mounting pins are used to set a home position of each of the first and second closing disks at a particular fore/aft distance, height and lateral spacing with respect to the ground opening member.

18. The disk assembly of claim 17, wherein the return assembly includes:
- a pivot rod coupled to the support frame along a pivot axis that is generally perpendicular to the ground opening member and disposed in openings of the first and second mounting assemblies; and
- at least one return spring applying a return pivot force to the first and second mounting assemblies for biasing each of the first and second closing disks in the associated home position.

19. The disk assembly of claim 17, wherein each of the first pair of mounting receptacles of the first mounting assembly include multiple mount openings of the first plurality of mount openings, and each of the second pair of mounting receptacles of the second mounting assembly include multiple mount openings of the second plurality of mount openings.

* * * * *